United States Patent [19]

Potter

[11] 3,717,993
[45] Feb. 27, 1973

[54] PREHEATER ASSEMBLY FOR STIRLING ENGINE

[75] Inventor: Russell F. Potter, Lockport, N.Y.

[73] Assignee: General Motors Corporation, Detroit, Mich.

[22] Filed: Nov. 2, 1970

[21] Appl. No.: 85,959

[52] U.S. Cl. ..................60/24, 165/52, 165/155, 123/122 D
[51] Int. Cl. ............................................F02m 23/14
[58] Field of Search...60/24; 123/122 D; 122/DIG. 1, 122/367; 165/52, 155

[56] References Cited

UNITED STATES PATENTS

| | | | |
|---|---|---|---|
| 964,410 | 7/1910 | Fox | 165/155 |
| 1,157,189 | 10/1915 | Snyder | 165/52 X |
| 3,015,475 | 1/1962 | Meijer et al. | 165/52 X |
| 1,339,870 | 5/1920 | Taylor | 123/122 D |
| 1,366,530 | 1/1921 | Gage | 123/122 D |
| 3,546,876 | 12/1970 | Fokker et al. | 60/24 |
| 3,186,394 | 6/1965 | Ramun | 123/122 D |

Primary Examiner—Martin P. Schwadron
Assistant Examiner—Allen M. Ostrager
Attorney—W. S. Pettigrew, J. C. Evans and K. H. MacLean, Jr.

[57] ABSTRACT

An air preheater for an external combustion engine which is supported around the engine cylinder to form a combustion chamber therebetween. Air enters the preheater inlet and flows through an annular flow passage in counter direction to the hot exhaust gas which flows through an abutting annular flow passage. The passages are separated by a thermally conductive wall. Insulation on the outer walls of the preheater prevents heat loss from intake air to atmosphere and an insulated divider wall separates the hot gas flow passage from the combustion chamber to prevent reheating of the exhaust gas.

1 Claim, 4 Drawing Figures

PATENTED FEB 27 1973

3,717,993

INVENTOR.
Russell F. Potter
BY K. H. MacLean, Jr.
ATTORNEY

PREHEATER ASSEMBLY FOR STIRLING ENGINE

This invention relates to air preheaters for external combustion engines of the Stirling type.

The efficiency of an external combustion engine is improved by increasing the temperature of air prior to introduction into the combustion chamber. Utilization of hot exhaust gas to warm the intake air makes use of otherwise wasted energy. The subject preheater for an external combustion engine includes a cylindrical member which surrounds the gas-filled cylinder of the engine to form a combustion chamber therebetween. An annular inlet air flow passage and hot exhaust gas flow passage are separated by a thermally conductive metal wall which transfers heat from the hot exhaust gas to inlet air. A divider wall defining the hot gas passage causes the hot gas to flow along the thermally conductive wall in heat transfer relation to the inlet air. Insulation on the divider wall prevents reheating of the gas exhaust as it flows adjacent the combustion chamber. Insulation on the outer walls of the preheater prevents heat loss to atmosphere from the warmed inlet air.

Therefore, an object of the invention is the provision of an air preheater for an external combustion engine including a cylindrical burner member or can which partially defines the engine's combustion chamber.

A still further object of the invention is the provision of an air preheater for an external combustion engine having adjacent annular exhaust flow passages separated from one another by an insulated wall to prevent reheat of the exhaust gas and consequential high exhaust temperatures.

A still further object of the invention is the provision of an air preheater for an external combustion engine having annular inlet air passages and exhaust gas passages formed by cylindrical walls one of which is insulated to prevent reheating of gas flowing along its one side caused by gas in the combustion chamber on its other side.

Further objects and advantages of the present invention will be apparent from the following detailed description, reference being had to the accompanying drawings in which a preferred embodiment is clearly shown.

IN THE DRAWINGS

Figure 1:
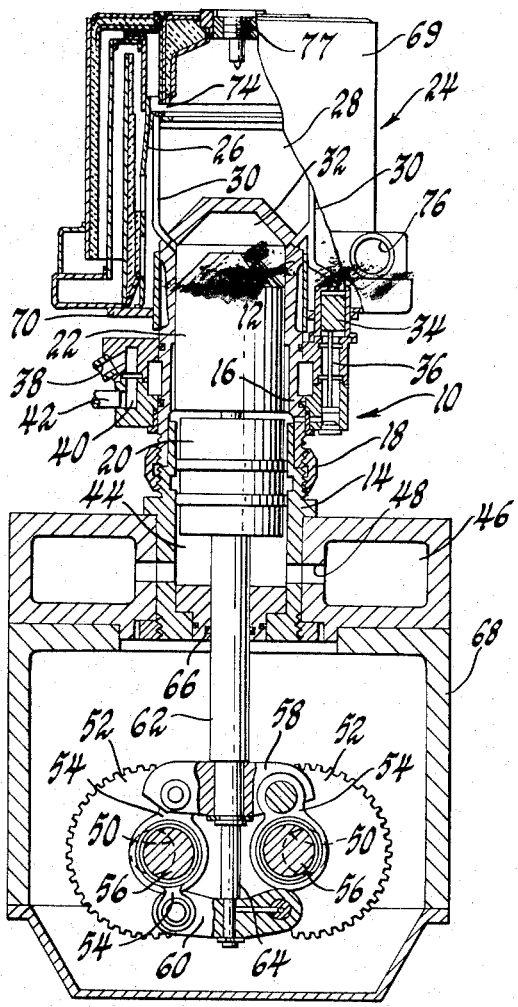
FIG. 1 is a vertical sectioned view of a Stirling-type external combustion engine including the subject air preheater.

In FIG. 1 of the drawings, a Stirling-type external combustion, hot gas engine 10 is shown. This engine is of the type disclosed in U.S. Pat. No. 3,364,675 to Dorer, granted Jan. 23, 1968, the disclosure of which is incorporated herein by reference. The engine includes a cylinder 12 which may be formed in any suitable fashion but for illustrative purposes it is shown to include a lower portion 14 and an upper portion 16 which are secured together by a threaded ring 18. A power piston 20 is reciprocably received in a lower portion 14 of cylinder 12 while a displacer piston 22 is reciprocably received in the upper portion 16.

An air preheater 24 is adapted to surround the upper end of cylinder 12 and includes a cylindrical burner member or can 26 which with the cylinder 12 forms a combustion chamber 28. Air and fuel are ignited in the combustion chamber 28 to power the Stirling-type engine 10. A plurality of heater tubes 30 in the combustion chamber 28 form a portion of a working chamber 32 and communicate with the interior portion of cylinder 12 above the displacer piston 22. A regenerator 34 and a cooler 36 are disposed adjacent cylinder 12 and connect through heater tubes 30 the volumes within the cylinder above and below displacer piston 22. These volumes and components comprise the working chamber 32 and permit passage of the working fluid from one end of the upper portion 16 of the cylinder to the other in response to reciprocation of the displacer piston 22. An inlet passage 38 conveys coolant to an annular chamber 40 communicating with cooler 36 and an outlet 42 conveys the coolant from the engine.

A buffer space 44 is provided in the lower portion 14 of the cylinder 12 beneath the power piston 20 and in communication with an annular chamber 46 through suitable passages 48.

Pistons 20 and 22 are connected for reciprocation in their respective portions of the cylinder 12 by a pair of crankshafts 50 rotatably connected by gears 52 and having connecting rods 54 carried on crank throws 56 and pivotally attached to upper and lower yokes 58 and 60, respectively. Upper yoke 58 is secured to one end of connecting rod 62 which connects with the power piston 20 while lower yoke 60 is secured to connected rod 64 which extends through connecting rod 62 and piston 20 and is secured to the displacer piston 22. Seals are provided at 66 to prevent leakage between the buffer space 44 and the crankcase 68 while other suitable seals (not shown) are located within piston 20 to prevent leakage between working chamber 32 and the crankcase 68. The above construction is known and represents the manner of constructing a Stirling-cycle engine according to the aforementioned Dorer patent.

Figure 2:
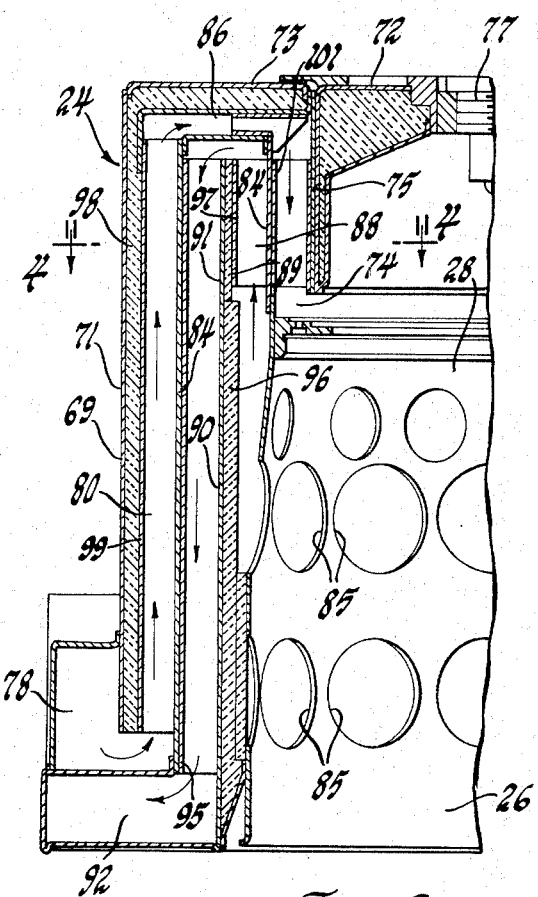
FIG. 2 is an enlarged vertical sectioned view of the air preheater.
Figure 3:
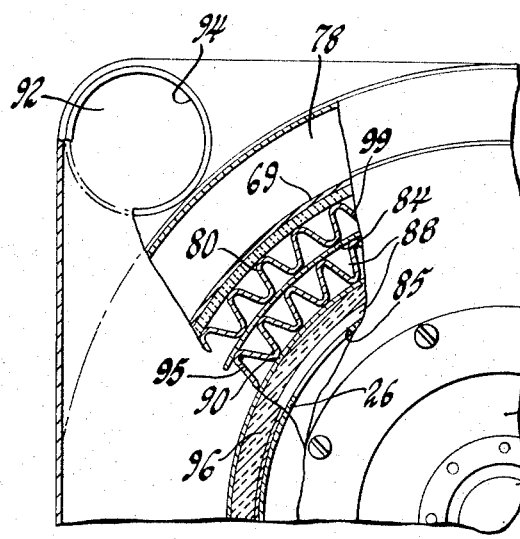
FIG. 3 is a fragmentary horizontal sectioned view of the air preheater.

The combustion system of engine 10 includes fuel and air supply means as well as means for igniting the combustible mixture in the combustion chamber 28. The subject air preheater 24 and its cylindrical burner can 26 is supported about the upper end of cylinder 12 on a radially outwardly extending flange portion 70 of the cylinder 12. The outer wall 69 of the preheater 24 has a generally cylindrical side portion 71 and an end portion 73. Centrally located in the top portion 73 of the air preheater 24 is a member 72 having a sleeve portion 75 which projects toward the upper end of burner can 26. Member 72 supports a fuel nozzle and igniter assembly 77 for supplying thermal energy to cylinder 12. Air is introduced into the combustion chamber 28 at 74 between burner can 26 and sleeve portion 75. The air passes into the preheater 24 through an inlet 76 as shown in FIGS. 2 and 3. Air flows from the inlet 76 into a chamber 78 and then axially upward through an annular passage 80 between the preheater's outer wall 69 and a thermally conductive 84. The inlet passage turns radially inward at 86 and extends axially downward into the combustion chamber 28 between the thermally conductive wall 84 and sleeve 75.

After combustion, in chamber 28, hot exhaust gas is formed which passes through a plurality of openings 85 in the wall of the burner can 26 into an exhaust gas passage 88. The passage 88 extends along the thermally conductive wall 84 between one side 89 of a divider wall 90 which is attached at its lower end to a burner can 26 and the wall 84. After the hot gas flows axially upward between side 89 of divider wall 90 and the wall 84, it is directed axially downward along the other side 91 of wall 90 into a chamber 92. The hot gas passes from chamber 92 through an outlet 94, as shown in FIG. 3.

Figure 4:
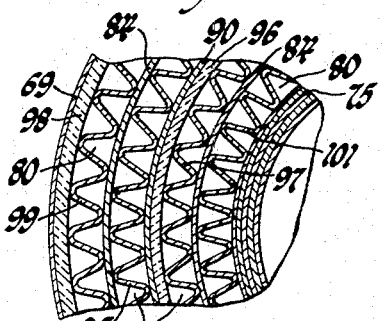
FIG. 4 is a sectional view taken along section line 4—4 in FIG. 2.

Corrugated fins or centers 95, 97, 99, 101 are brazed to both sides of the thermally conductive wall 84. These centers are in both legs of the flow passages 80 and 88 as shown in FIG. 4. Centers 95 and 97 receive heat from the hot gas in passage 88 and transfer it through wall 84 to the centers 99, 101 and to the inlet air in passage 80.

The thermally conductive wall 84 is connected to the upper end of the cylindrical burner can 26 and extends axially upward, radially outward and axially downward to separate the air passage 80 from the exhaust passage 88. The heat from the hot gas in passage 88 is transferred to air in passage 80 through wall 84. The flow of air through the preheater along one side of wall 84 is in an opposite direction as the flow of hot gas along the other side of wall 84.

It is now obvious that the hot gas products of combustion flow from the combustion chamber 28 along the one side 89 of divider wall 90 and then along the other side 91 of the divider wall. In its passage from combustion chamber 28 to gas outlet 94, the gas decreases in temperature as it releases heat to the intake air on the other side of the thermally conductive wall 84. Insulation 96 on the divider wall 90 prevents hot gas immediately from the combustion chamber from reheating gas on the side 91 of divider wall 90 to maintain the exhaust gas at a low temperature. Insulation 98 is applied to the side portion 71 and end portion 73 of outer wall 69 to reduce cooling of the inlet air as it travels along the passage 80 by atmosphere.

While the invention as herein described and illustrated constitutes a preferred embodiment, it is apparent that other forms may be adapted.

What is claimed is:

1. An air preheater for an external combustion engine which has a cylinder enclosing a gas-filled working space comprising: a cylindrical burner can having a first open end adapted to be supported around the end of said cylinder to form a combustion chamber between said burner can and said cylinder for supplying thermal energy to gas in said cylinder; the second end of said cylinder burner can being opened to form an air inlet to said combustion chamber; a first cylindrical wall connected to the second end of said burner can and extending axially away from said combustion chamber; a second cylindrical wall encircling said first cylindrical wall and spaced radially outward; a cylindrical outer wall of the preheater around said first and second walls; said first and second cylindrical walls being connected together along adjacent edges to form connected annular air inlet passages between said outer cylindrical wall and said first and second cylindrical walls; said cylindrical burner can having exhaust openings through its cylindrical side surface for discharging hot exhaust gas from said combustion chamber; a cylindrical divider wall connected to said first end of the burner can and extending in an axial direction past said second end of the burner can and between said first and second cylindrical walls to form a hot gas passage extending from said exhaust openings along one side of said divider wall and said first cylindrical wall and then back along the other side of said divider wall and along said second cylindrical wall whereby thermal energy is transmitted through said first and second cylindrical walls from the hot exhaust gases to air flowing into the combustion chamber through said air inlet passage; insulating means on said divider wall for preventing the transmittal of heat from the hot gases in the radially inward portion of the exhaust passageway to the lower temperature hot gases in the radially outward portion of the discharge passage thus preventing the wasteful reheating of the cooler exhaust gases further away from the combustion chamber.

* * * * *